United States Patent
Speight et al.

(10) Patent No.: US 8,301,685 B2
(45) Date of Patent: *Oct. 30, 2012

(54) METHOD AND APPARATUS FOR MANAGING TRANSMISSION OF TCP DATA SEGMENTS

(75) Inventors: Timothy James Speight, Avon (GB); Nicholas Jelbert, Avon (GB)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/921,306

(22) PCT Filed: Mar. 4, 2009

(86) PCT No.: PCT/EP2009/001535
§ 371 (c)(1),
(2), (4) Date: Dec. 3, 2010

(87) PCT Pub. No.: WO2009/109375
PCT Pub. Date: Sep. 11, 2009

(65) Prior Publication Data
US 2011/0122816 A1    May 26, 2011

Related U.S. Application Data

(63) Continuation of application No. 12/042,259, filed on Mar. 4, 2008, now Pat. No. 8,015,313.

(51) Int. Cl.
*G06F 15/16* (2006.01)
(52) U.S. Cl. ......................... 709/200; 709/236
(58) Field of Classification Search .................. 709/200, 709/236
See application file for complete search history.

(56) References Cited

U.S. PATENT DOCUMENTS

| | | | | |
|---|---|---|---|---|
| 5,959,995 A | * | 9/1999 | Wicki et al. | 370/400 |
| 6,338,131 B1 | * | 1/2002 | Dillon | 712/201 |
| 6,473,425 B1 | * | 10/2002 | Bellaton et al. | 370/392 |

(Continued)

FOREIGN PATENT DOCUMENTS

EP    0 912 028    4/1999

OTHER PUBLICATIONS

U.S. Appl. No. 13/204,292, filed Aug. 5, 2011, Speight, et al.

(Continued)

*Primary Examiner* — Imad Hussain
(74) *Attorney, Agent, or Firm* — Oblon, Spivak, McClelland, Maier & Neustadt, L.L.P.

(57) ABSTRACT

A communication device is arranged to transmit data segments over an interface, wherein the communication device comprises transmission management logic. In response to receipt of a data segment for transmission over the interface, the transmission management logic is arranged to determine a sequence number of a data segment to be transmitted and compare the sequence number of the data segment to be transmitted with at least one pending sequence number of a previous data segment. Based on the comparison, the transmission management logic either discards the data segment to be transmitted if the sequence number of the data segment to be transmitted matches the at least one pending sequence number of the previous data segment; or adds the sequence number of the data segment to be transmitted to the at least one pending sequence number and transmits the data segment over the interface if the sequence number of the data segment to be transmitted does not match the at least one pending sequence number.

17 Claims, 4 Drawing Sheets

U.S. PATENT DOCUMENTS

| | | | |
|---|---|---|---|
| 6,700,871 B1 * | 3/2004 | Harper et al. | 370/235 |
| 6,876,657 B1 * | 4/2005 | Brewer et al. | 370/394 |
| 7,072,342 B1 * | 7/2006 | Elnathan | 370/394 |
| 7,171,230 B2 | 1/2007 | Anderson | |
| 7,292,825 B2 | 11/2007 | Beale et al. | |
| 7,298,746 B1 * | 11/2007 | De La Iglesia et al. | 370/394 |
| 7,313,118 B2 | 12/2007 | Geers | |
| 7,373,161 B2 | 5/2008 | Anderson | |
| 7,480,261 B2 | 1/2009 | Speight | |
| 7,480,276 B2 | 1/2009 | Moloney | |
| 7,480,308 B1 * | 1/2009 | Cohen et al. | 370/412 |
| 7,539,497 B2 | 5/2009 | Beale | |
| 7,554,947 B2 | 6/2009 | Speight | |
| 7,602,719 B2 | 10/2009 | Speight et al. | |
| 7,616,603 B2 | 11/2009 | Anderson et al. | |
| 7,620,367 B2 | 11/2009 | Anderson | |
| 7,639,635 B2 | 12/2009 | Anderson et al. | |
| 7,664,090 B2 | 2/2010 | Anderson et al. | |
| 7,684,372 B2 | 3/2010 | Beale et al. | |
| 7,701,901 B2 | 4/2010 | Anderson | |
| 7,710,926 B2 | 5/2010 | Beale | |
| 2002/0075873 A1 * | 6/2002 | Lindhorst-Ko et al. | 370/394 |
| 2003/0081664 A1 * | 5/2003 | Lu et al. | 375/222 |
| 2003/0227875 A1 * | 12/2003 | Wei et al. | 370/252 |
| 2004/0110499 A1 * | 6/2004 | Kang et al. | 455/422.1 |
| 2004/0190537 A1 * | 9/2004 | Ferguson et al. | 370/412 |
| 2005/0147042 A1 * | 7/2005 | Purnadi et al. | 370/236 |
| 2005/0160478 A1 * | 7/2005 | Ramaiah et al. | 726/14 |
| 2005/0226239 A1 * | 10/2005 | Nishida et al. | 370/389 |
| 2005/0249305 A1 | 11/2005 | Ponnampalam et al. | |
| 2005/0265279 A1 * | 12/2005 | Markovic et al. | 370/328 |
| 2005/0286526 A1 * | 12/2005 | Sood et al. | 370/394 |
| 2006/0034285 A1 * | 2/2006 | Pirskanen et al. | 370/394 |
| 2006/0120375 A1 * | 6/2006 | Ravikumar et al. | 370/392 |
| 2006/0182191 A1 | 8/2006 | Darwood et al. | |
| 2006/0221872 A1 | 10/2006 | Jones et al. | |
| 2006/0223585 A1 | 10/2006 | Legg | |
| 2007/0041347 A1 | 2/2007 | Beale et al. | |
| 2007/0042784 A1 | 2/2007 | Anderson | |
| 2007/0047513 A1 | 3/2007 | Anderson | |
| 2007/0110140 A1 | 5/2007 | Howard et al. | |
| 2007/0223379 A1 * | 9/2007 | Sivakumar et al. | 370/235 |
| 2007/0274342 A1 * | 11/2007 | Kim et al. | 370/473 |
| 2007/0291662 A1 * | 12/2007 | Mangin et al. | 370/252 |
| 2008/0043658 A1 | 2/2008 | Worrall | |
| 2008/0080464 A1 | 4/2008 | Speight | |
| 2008/0095081 A1 | 4/2008 | Legg et al. | |
| 2008/0107116 A1 * | 5/2008 | Godiwala et al. | 370/394 |
| 2008/0144600 A1 | 6/2008 | Anderson | |
| 2008/0207251 A1 | 8/2008 | Anderson | |
| 2008/0267148 A1 | 10/2008 | Speight | |
| 2008/0318578 A1 | 12/2008 | Worrall | |
| 2009/0052384 A1 | 2/2009 | Zisimopoulous et al. | |
| 2009/0228602 A1 | 9/2009 | Speight et al. | |
| 2009/0232110 A1 | 9/2009 | Speight | |

OTHER PUBLICATIONS

International Search Report issued Aug. 3, 2009 in PCT/EP09/01535 filed on Mar. 4, 2009.

* cited by examiner

FIG. 1
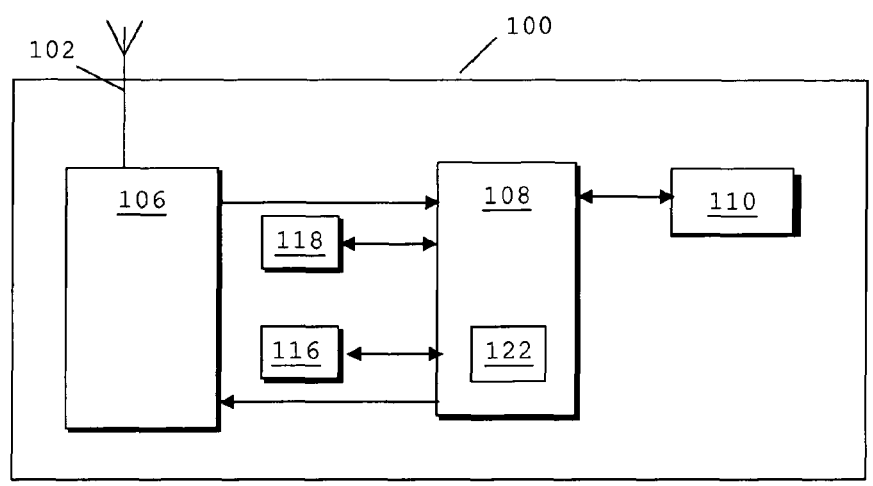
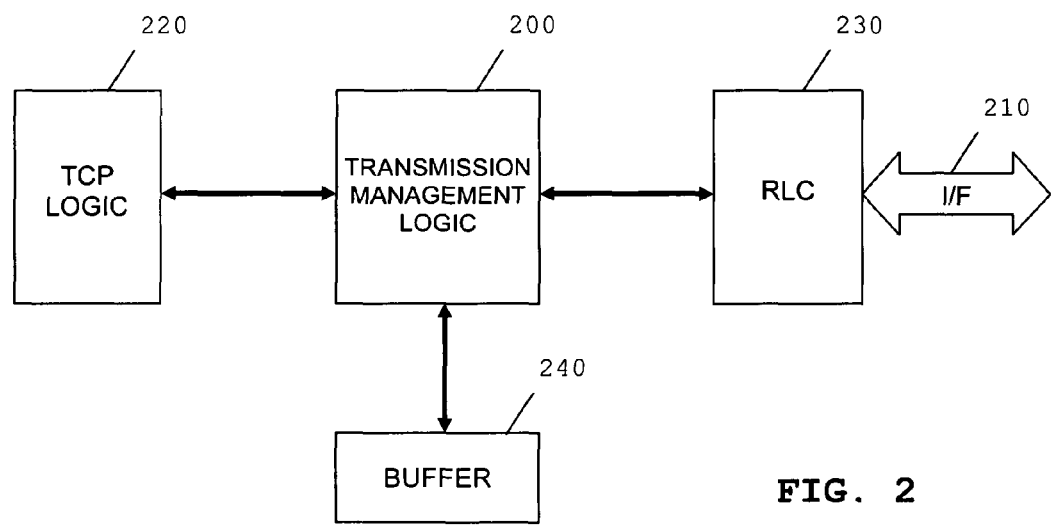
FIG. 2

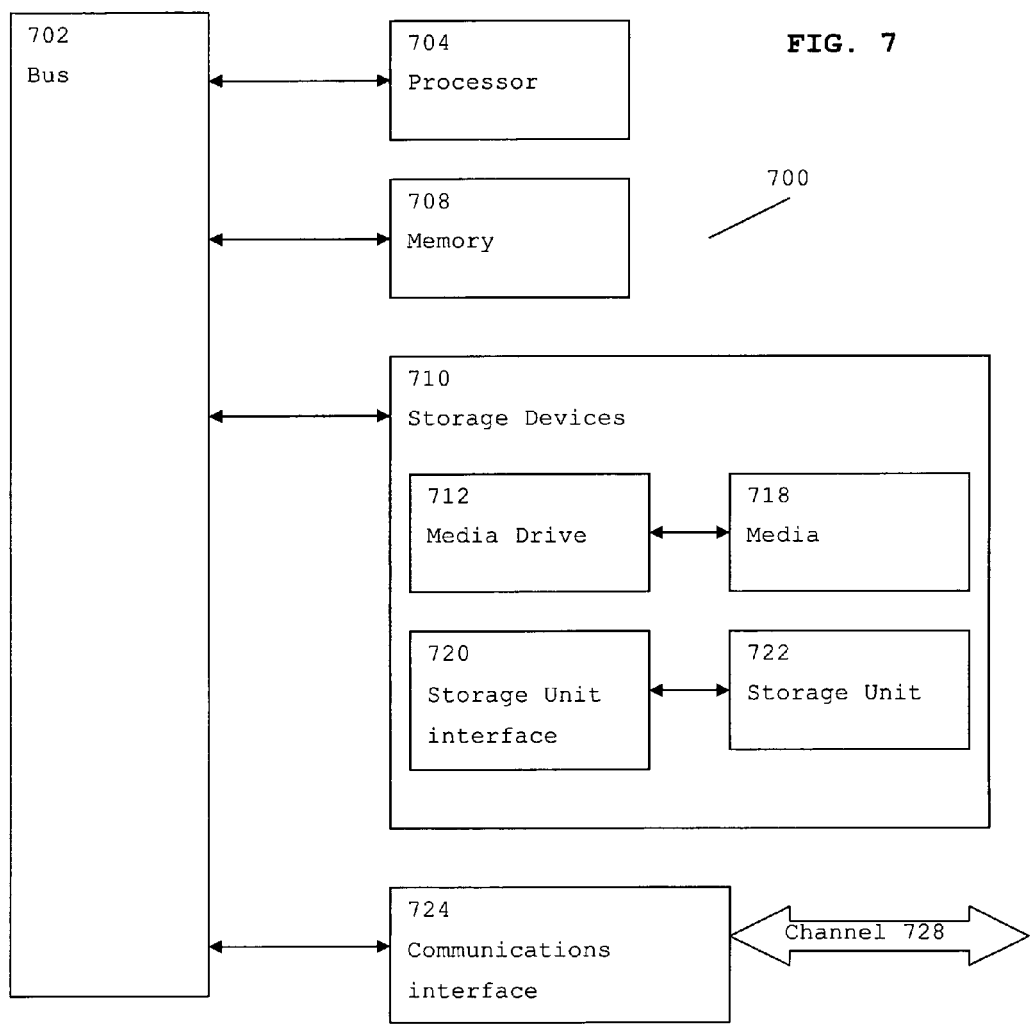

METHOD AND APPARATUS FOR MANAGING TRANSMISSION OF TCP DATA SEGMENTS

FIELD OF THE INVENTION

The field of the invention relates to a method and apparatus for managing transmission of data segments over an interface, and more particularly to a method and apparatus for managing the transmission of transmission control protocol (TCP) data segments over an air interface of a wireless communication network.

BACKGROUND OF THE INVENTION

In the field of this invention, it is known for devices to communicate across networks by way of protocols, the protocols acting as a set of rules governing how information, data, etc. is to be sent and/or received. The Transmission Control Protocol/Internet Protocol (TCP/IP) protocol suite has become the de facto standard for computer communications in today's networks. The TCP/IP protocol suite is so named for two of its most important protocols: Transmission Control Protocol (TCP) and Internet Protocol (IP). Another name for it is the Internet Protocol Suite, which is the phrase used in official Internet standards documents.

As will be appreciated by a skilled artisan, in wireless systems, for example a Universal Mobile Telecommunications System (UMTS), the air interface suffers from a high-loss data rate. Thus, such systems involve some form of re-transmission protocol, such as radio link control (RLC) in the data link layer, or HARQ (Hybrid Automatic Repeat reQuest) functionality at the MAC (Medium Access Control) layer, to provide re-transmission functionality. Due to the need to perform retransmissions, and the constantly changing air interface conditions, the round trip time (RTT) for data packets (namely a time taken from a transmission of a packet to the receipt of an acknowledgement for the packet) is variable. As a result, such air interfaces are known to suffer from a high and variable communication latency.

A problem caused by the high latency of wireless communication systems is that, when a TCP packet is transmitted, a timer is started. If the sender of a TCP packet does not receive an acknowledgement for that packet before the timer reaches the determined RTO (retransmission time-out) value, the TCP packet will be re-transmitted. The RTO value is determined by measuring previous segment RTT values (a number of methods for determining RTO from previous measured segment RTT have been presented in [RFC793] and [V. Jacobsen, 'Congestion avoidance and control, Computer communications review, 1988]). The TCP timer may therefore time-out, resulting in the re-transmission of the packet, whilst the RLC or HARQ is still in the process of trying to transmit the original instance of the packet over the air interface. As a result, the RLC may end up with two, and maybe more, instances of the same TCP packet to transmit across the air interface. Consequently, the same data packet may be effectively transmitted over the air interface twice or more. As will be appreciated by a skilled artisan, such duplication of data transmission is not only wasteful of air interface resources, but also further compounds the problem of the air interface suffering from a high latency.

Thus there exists a need for an improved method and apparatus for managing the transmission of data segments over an interface that substantially alleviates the above mentioned problems.

SUMMARY OF THE INVENTION

According to a first aspect of the invention, there is provided a communication device arranged to transmit a data segment over an interface. The communication device comprises transmission management logic, which in response to receipt of a data segment for transmission over the interface, determines a sequence number of a data segment to be transmitted. The transmission management logic is arranged to compare the sequence number of the data segment to be transmitted with at least one pending sequence number of a previous data segment. Based on the comparison, the transmission management logic either discards the data segment to be transmitted if the sequence number of the data segment to be transmitted matches the at least one pending sequence number of the previous data segment; or adds the sequence number of the data segment to be transmitted to the at least one pending sequence number and transmits the data segment over the interface if the sequence number of the data segment to be transmitted does not match the at least one pending sequence number.

Thus, embodiments of the invention may allow improved use of interface resources, for example by discarding duplicate data segments, thereby substantially preventing unnecessary transmission of data segments over the interface.

According to an optional feature of the invention, in response to receipt of an acknowledgement that a data segment has been successfully received by a peer device, the transmission management logic is arranged to remove the sequence number of the acknowledged data segment from the at least one pending sequence number. According to a further optional feature of the invention, in response to receipt of a transmission failure message for a data segment, the transmission management logic is arranged to remove the sequence number of the data segment for which transmission failed from the pending sequence numbers. Thus, in this manner disruption of re-transmission mechanisms and the like may be substantially avoided.

According to an optional feature of the invention, a plurality of pending sequence numbers may be stored as a list of pending sequence numbers within a memory element of the communication device, and the sequence number of the received data segment to be transmitted is considered as matching the at least one pending sequence number if the same sequence number is present within the list of pending sequence numbers.

According to an optional feature of the invention, the plurality of pending sequence numbers may be stored as a range of sequence numbers, and a first pending sequence number, for example, which may represent a lower limit of the range of sequence numbers, and a second pending sequence number, for example, which may represent an upper limit of the range of sequence numbers, is stored within a memory element of the communication device. The sequence number of the received data segment is considered as matching the at least one pending sequence number if the sequence number of the data segment to be transmitted is within the range of sequence numbers represented by the first pending sequence number and second pending sequence number stored in memory.

According to an optional feature of the invention, the data segment comprises a Transmission Control Protocol (TCP) data segment.

According to an optional feature of the invention, the interface comprises an air interface within a wireless communication network.

According to an optional feature of the invention, transmitting the received data segment over the interface comprises forwarding the data segment to interface control logic. According to an optional feature of the invention, the transmission management logic forms a part of interface control logic. According to an optional feature of the invention, the interface control logic comprises Radio Link Control logic. According to an optional feature of the invention, the interface control logic comprises Hybrid Automatic Repeat reQuest (HARQ) logic.

According to an optional feature of the invention, the communication device comprises a user equipment (UE), or a network element within a cellular communication system, or a network element within a Radio Access Network (RAN) of the cellular communication system. According to an optional feature of the invention, the communication device may comprise a Serving General Packet Radio Service (GPRS) Support Node (SGSN).

According to a second aspect of the invention, there is provided a method for managing transmission of data segments over an interface. The method comprises: receiving a data segment for transmission over the interface; comparing a sequence number of the received data segment with at least one pending sequence number of previously received data segments; and if the sequence number of the received data segment matches the at least one pending sequence number, discarding the received data segment. If the sequence number of the received data segment does not match the at least one pending sequence number, the method comprises adding the sequence number of the received data segment to the at least one pending sequence number and transmitting the received data segment over the interface.

According to a third aspect of the invention, there is provided a computer-readable storage element having computer-readable code stored thereon for programming signal processing logic to perform the method for managing transmission of data segments over an interface according to the second aspect of the invention.

These and other aspects, features and advantages of the invention will be apparent from, and elucidated with reference to, the embodiment(s) described hereinafter.

BRIEF DESCRIPTION OF THE DRAWINGS

Embodiments of the invention will be described, by way of example only, with reference to the accompanying drawings, in which:

FIG. 1 illustrates a block diagram of part of a wireless communication device adapted to support of embodiments of the invention;

FIG. 2 illustrates transmission management logic according to embodiments of the invention;

FIG. 7 illustrates a typical computing system that may be employed to implement processing functionality in embodiments of the invention.

DESCRIPTION OF EMBODIMENTS OF THE INVENTION

Figure 3:
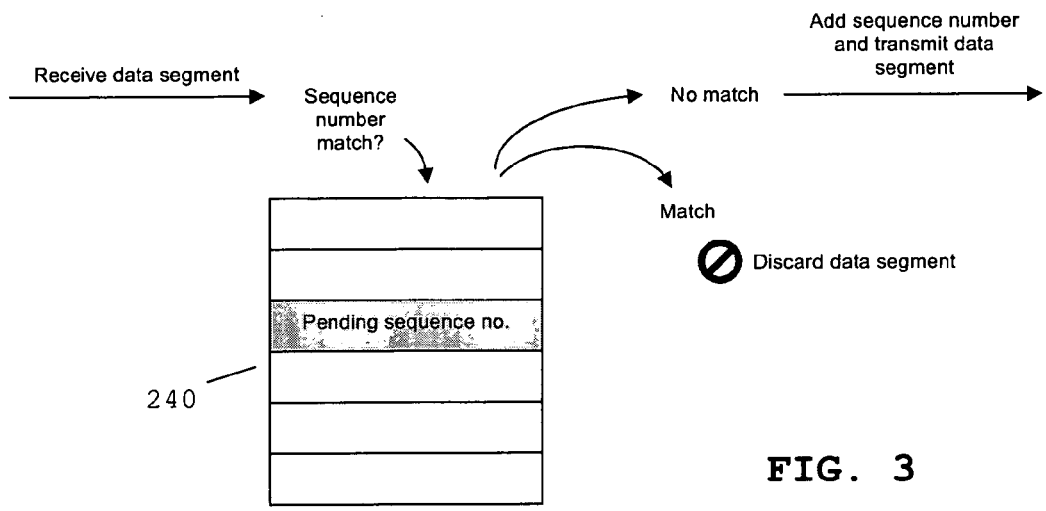
FIG. 3 illustrates transmission logic functionality according to embodiments of the invention.

Embodiments of the invention will be described in a context of a mobile telephone handset, for example adapted to communicate over a Universal Mobile Telecommunications System (UMTS) Radio Access Network (UTRAN) system. However, it will be appreciated that embodiments of the invention are not limited to a mobile telephone handset, but may be implemented within alternative communication devices or network elements with which data segments are transmitted over an interface.

Referring now to FIG. 1, there is illustrated a block diagram of part of a wireless communication device 100, adapted to support embodiments of the invention. The communication device 100, in the context of the illustrated embodiment of the invention, is user equipment (UE) in a form of a mobile telephone handset comprising an antenna 102. As such, the communication device 100 contains a variety of well known Radio Frequency (RF) components or circuits 106, operably coupled to the antenna 102 that will not be described further herein. The communication device 100 further comprises signal processing logic 108. An output from the signal processing logic 108 is provided to a suitable user interface (UI) 110 comprising, for example, a display, keypad, loudspeaker, and/or microphone.

The signal processing logic 108 is coupled to a memory element 116 that stores operating regimes, such as decoding/encoding functions and the like and may be realised in a variety of technologies such as random access memory (RAM) (volatile), (non-volatile) read only memory (ROM), Flash memory or any combination of these or other memory technologies. A timer 118 is typically coupled to the signal processing logic 108 to control the timing of operations within the communication device 100.

In accordance with embodiments of the invention, the signal processing logic 108 is arranged to execute computer-readable code, for example stored within the memory element 116, and to perform the method of managing transmission of data segments over an interface, for example over an air interface via radio frequency (RF) components or circuitry 106 and antenna 102, as hereinafter described.

Referring now to FIG. 2, there is illustrated transmission management logic 200 according to embodiments of the invention. For example, the transmission management logic 200 may comprise computer-readable code to be executed by signal processing logic, such as the signal processing logic 108 of FIG. 1.

The transmission logic 200 is arranged to receive data segments for transmission over an interface 210 to a peer device (not shown), for example over an air interface of a wireless communication network. For the illustrated embodiment, the transmission management logic 200 is operably coupled to Transmission Control Protocol (TCP) logic 220, from which the transmission management logic 200 receives data segments. Accordingly, for the illustrated embodiments the received data segments are in the form of TCP data segments. As will be appreciated by a skilled artisan, the Transmission Control Protocol/Internet Protocol (TCP/IP) protocol suite is well known in the art, and is defined in RFC 793. As such the TCP logic 220 will not be described further herein.

Also for the embodiment illustrated in FIG. 2, the management logic 200 is operably coupled to the interface 210 via interface control logic, which for the illustrated embodiment is in the form of Radio Link Control (RLC) logic 230. As will also be appreciated by a skilled artisan, the RLC logic 230 is a well known part of the data link layer within a UMTS network, and is defined in the 3GPP TS25.322 specification. Consequently, the RLC 230 will also not be described further herein.

As will be appreciated by a skilled artisan, the TCP logic 220 may form a part of high layer functionality within, for example, the communication device. Alternatively, the TCP logic 220 may form a part of a separate device, for example a personal computer or the like, operably coupled to a communication device comprising the transmission logic 200. Alternatively still, the transmission logic 200 may be provided within, for example, a part of a Radio Access Network (RAN), whilst the TCP logic 220 may be located within a part of a core network.

The transmission management logic 200 further comprises, or for the illustrated is operably coupled to, a buffer 240, for example located in memory element 116 in FIG. 1.

As previously mentioned, when a TCP segment is transmitted, a timer may be started. If the sender of the data segment does not receive an acknowledgement of the receipt for that data segment before the timer reaches the RTO value, the TCP segment will be re-transmitted. This process is TCP functionality defined in [RFC 793].

However, the transmission of a data segment may be delayed due to the latency of the interface 210, for example due to changing air interface conditions, resulting in a high loss rate, and thus, possibly, requiring the RLC 230 to provide such re-transmission functionality. As a consequence, the timer may expire, resulting in the retransmission of the packet while the RLC 230 is still in the process of trying to transmit the original instance of the packet over the interface 210.

Referring now to FIG. 3, there is illustrated transmission manager logic functionality adapted according to an embodiment of the invention. In response to receipt of a data segment for transmission over the interface 210, for example a TCP data segment from the TCP logic 220 of FIG. 2, the transmission management logic 200 is arranged to compare a sequence number of the received data segment, such as the 32-bit sequence number located within the header section of a TCP segment, with pending sequence numbers of previously received data segments. In this manner, duplicate data segments comprising sequence numbers that match pending sequence numbers of previously received data segments may be identified.

If the sequence number of the received data segment matches a pending sequence number, the transmission management logic 200 of FIG. 2 is further arranged to discard the received data segment. Alternatively, if the sequence number of the received data segment does not match a pending sequence number, the transmission management logic 200 is further arranged to add the sequence number of the received data segment to the pending sequence numbers and transmit the received data segment over the interface.

For example, the pending sequence numbers may be stored as a list of pending sequence numbers within the buffer 240 of FIG. 2, and the sequence number of the received data segment matches a pending sequence number if the same sequence number is present within the list of pending sequence numbers.

Alternatively, the pending sequence numbers may be stored as a range of sequence numbers, wherein a first pending sequence number, say representing a lower limit of the range of pending sequence numbers, and a second pending sequence number, say representing an upper limit of the range of pending sequence numbers, are stored within the buffer 240, and the sequence number of the received data segment is considered as matching a pending sequence number if the sequence number of the received data segment is within the range of sequence numbers represented by the first and second sequence numbers stored in memory.

In this manner, duplicate data segments may be discarded, substantially preventing the RLC logic 230 from comprising a plurality of instances of the same data segment to transmit across the interface 210. Consequently, a data segment is not unnecessarily transmitted over the air interface. In this manner, employing the embodiments described herein enable a data communication system to utilising interface resources more economically.

As will be appreciated by a skilled artisan, prior to being transmitted, the data segment may need to be buffered, or otherwise held, until an interface resource is allocated to the data segment, or where air interface conditions are too poor for the transmission of data, until air interface conditions for the interface improve sufficiently for data to be transmitted over it. Furthermore, the data segment may be broken up into Protocol Data Units (PDUs) for transmission over the air interface.

The transmission management logic may be arranged to remove a sequence number from the pending sequence numbers in response to receipt of an acknowledgement that the data segment to which that sequence number relates has been successfully received by the peer device (not shown). For example, in the case of an 'uplink' data flow, with data flowing from a wireless communication device to a Node-B of a UMTS network, the peer device may comprise the RLC logic of the Node-B.

The transmission management logic may further be arranged to remove a sequence number from the pending sequence numbers in response to receipt of a transmission failure message for the data segment to which the sequence number relates (i.e. the RLC has tried to send the data segment for a fixed number of times but has not received an acknowledgement that the packet was received by the peer device for any of these attempts).

For example, when all PDUs of a data segment have been successfully received by the peer (receiving) RLC entity, the RLC logic 230 may provide an acknowledgement of their successful transmission to the transmission management logic 200. Alternatively, where the RLC logic 230 fails to successfully transmit a data segment over the interface 210, the RLC logic 230 may provide a reset or Move Receiver Window (MRW) message to the transmission management logic 200, thereby indicating that the RLC logic 230 has discarded the data segment.

The sequence number of the data segment to which the received message relates, which in a case of a receipt of a reset message may be all pending sequence numbers, is/are removed from the list of range of pending sequence numbers stored in the buffer 240 of FIG. 2. For example, if the pending sequence numbers are stored as a list of sequence numbers, the sequence number of the data segment to which the received message relates is removed from the list. Alternatively, if the pending sequence numbers are stored as a range of numbers, the range of numbers is amended accordingly to remove the sequence number of the data segment therefrom.

As will be appreciated by a skilled artisan, by removing the sequence numbers of data segments that have either been successfully transmitted, or for which the transmission has failed, re-transmission mechanisms etc. within, for example, the TCP logic 220 are not disrupted.

Consequently, in a case of a failed transmission, a subsequent re-transmission of the data segment by the TCP logic will not be discarded, and thus allowed to be transmitted over the interface. Similarly, when a data segment is successfully transmitted across the interface, only to subsequently be lost or discarded prior to reaching its destination, a subsequent re-transmission of the data segment will not be discarded by the transmission management logic, and thus will be allowed to be transmitted over the interface.

Figure 4:
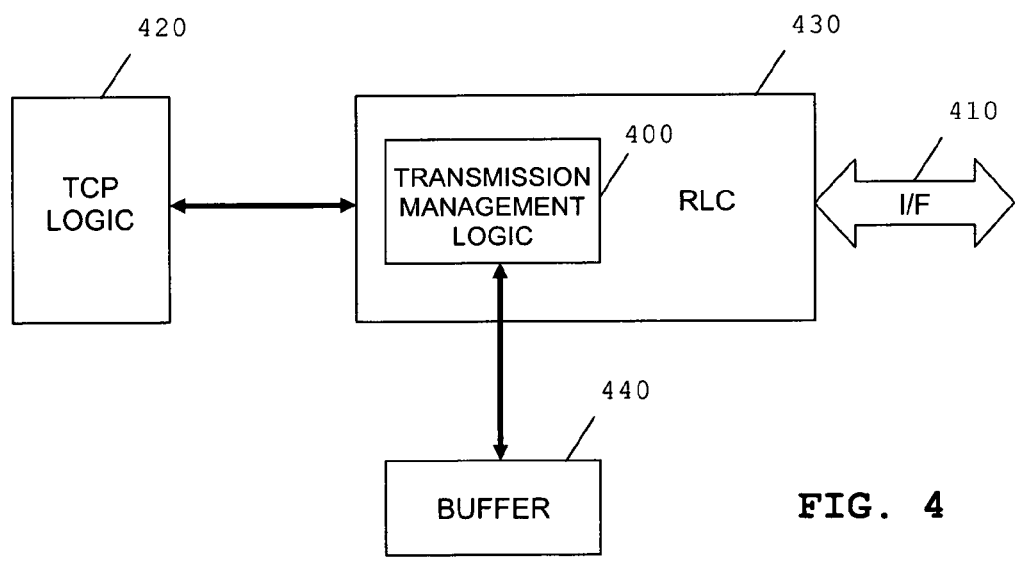
FIG. 4 illustrates transmission management logic according to alternative embodiments of the invention.

Referring now to FIG. 4, there is illustrated transmission management logic 400 according to an alternative embodiment of the invention.

The transmission management logic 400 is arranged to receive data segments for transmission over an interface 410, for example an air interface of a wireless communication network.

For the illustrated embodiment, the transmission management logic 400 forms a part of interface control logic 430, which for the illustrated embodiment is in the form of RLC logic, and is operably coupled to TCP logic 420, from which the transmission management logic 400 receives data segments. Accordingly, for the illustrated embodiments the received data segments are in a form of TCP data segments. The transmission management logic 400 further comprises, or for the illustrated is operably coupled to, a buffer 440.

Figure 5:
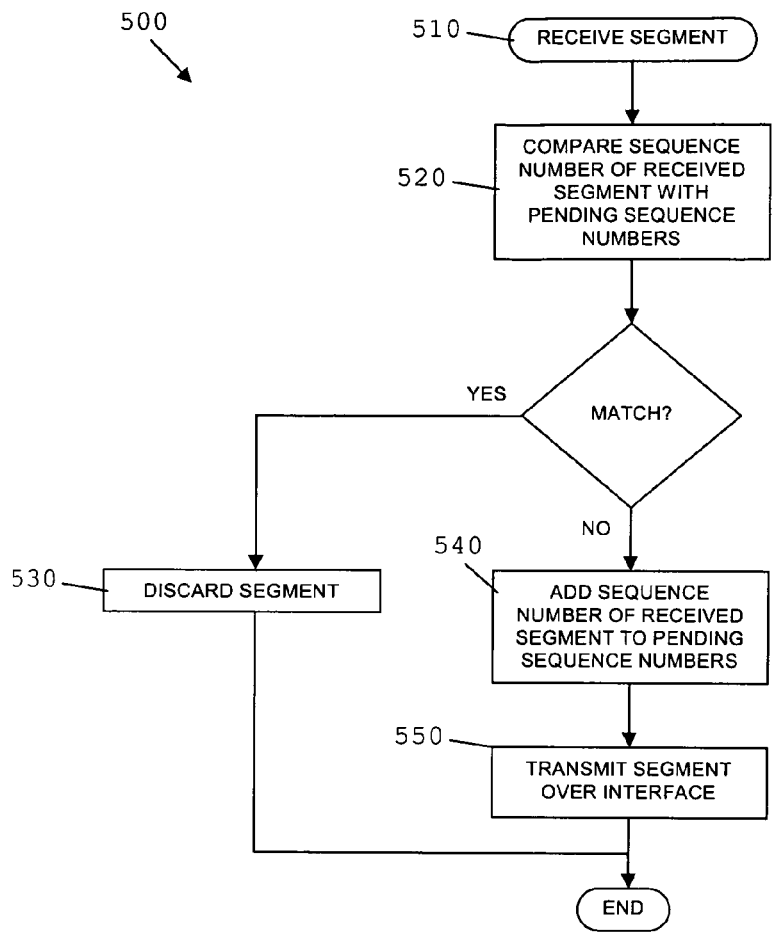
FIGS. 5 and 6 illustrate simplified flowcharts of a method for managing transmission of data segments of an interface.
Figure 6:
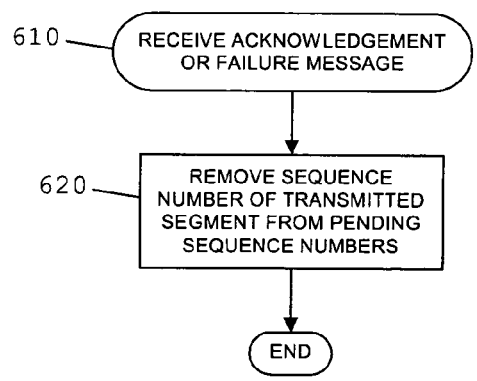

Referring now to FIG. 5 and FIG. 6, there are illustrated simplified flowcharts 500, 600 of a method for managing transmission of data segments over an interface. The flowchart 500 of FIG. 5 starts with a receipt of a data segment for transmission over the interface, in step 510, and moves to step 520, where a sequence number of the received data segment is compared with pending sequence numbers.

If the sequence number of the received data segment matches a pending sequence number in step 520, the method moves to step 530, and the received data segment is discarded. The method then ends.

Alternatively, if the sequence number of the received data segment does not match a pending sequence number, in step 530, the method moves to step 540, and the sequence number of the received data segment is added to the pending sequence numbers. The method then moves to step 550, where the received data segment is transmitted over the interface.

The flowchart 600 of FIG. 6 starts with a receipt of a message acknowledging successful reception of a data segment at the peer RLC entity, or indicating data segment transmission failure, in step 610.

For example, for the embodiment illustrated in FIG. 2, when all PDUs of a data segment have been successfully received by the peer RLC entity (not shown), the RLC 230 may provide an acknowledgement of their successful transmission to the transmission management logic 200. Alternatively, where the message indicates failure to transmit a data segment, step 610 may comprise receiving a reset or Move Receiving Window (MRW) message, indicating that the data segment has been discarded.

Next, in step 620, the sequence number of the data segment to which the received message relates, which in the case of a receipt of a reset message may be all pending sequence numbers, is/are removed from pending sequence numbers stored in memory, and the method ends. For example, if the pending sequence numbers are stored as a list of sequence numbers, the sequence number of the data segment to which the received message relates is removed from the list. Alternatively, if the pending sequence numbers are stored as a range of numbers, the range of numbers is amended accordingly to remove the sequence number of the data segment therefrom.

For the various embodiments illustrated and hereinbefore described, the transmission management logic 200, 400 has been operably coupled to, or formed a part of, interface control logic in the form of RLC logic 230, 430. However, it is contemplated that the transmission management logic 200, 400 may be coupled to any interface control logic operating beneath, for example, a TCP protocol layer, and comprising a retransmission scheme in a high latency communication system. For example, the transmission management logic may alternatively be provided between the TCP protocol layer and interface control logic comprising HARQ (Hybrid Automatic Repeat reQuest) logic in a MAC (Medium Access Control) layer.

Although one embodiment of the invention describes a wireless communication device, potential applications are not restricted to this embodiment. In particular, for example, a network element within, say, a Radio Access Network (RAN) or a Serving General Packet Radio Service (GPRS) Support Node (SGSN) of a cellular communication system, may be adapted to perform the method of transmitting data segments over an interface as hereinbefore described, and will therefore be able to benefit from the concepts described hereinbefore.

The aforementioned embodiments aim to provide one or more of the following advantages:
(i) Duplicate data segments for transmission over an interface are discarded, thereby substantially preventing unnecessary transmission of data segments over the interface;
(ii) More economical use of interface resources;
(iii) Provides an efficient interaction with RLC so that segments subject to reset or MRW are dealt with appropriately.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

FIG. 7 illustrates a typical computing system 700 that may be employed to implement processing functionality in embodiments of the invention. Computing systems of this type may be used in the UE (which may be an integrated device, such as a mobile phone or a USB/PCMCIA modem), or NodeB (in particular, the scheduler of the NodeB), core network elements, such as the GGSN, and RNCs, for example. Those skilled in the relevant art will also recognize how to implement the invention using other computer systems or architectures. Computing system 700 may represent, for example, a desktop, laptop or notebook computer, handheld computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communications medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory (ROM) or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 718 may include, for example, a hard disk, floppy disk, magnetic tape, optical disk, CD or DVD, or other fixed or removable medium that is read by and written to by media drive 714. As these examples illustrate, the storage media 718 may include a computer-readable storage medium having stored therein particular computer software or data.

In alternative embodiments, information storage system 710 may include other similar components for allowing computer programs or other instructions or data to be loaded into computing system 700. Such components may include, for example, a removable storage unit 722 and an interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a universal serial bus (USB) port), a PCMCIA slot and card, etc. Software and data transferred via communications interface 724 are in the form of signals which can be electronic, electromagnetic, and optical or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 708, storage device 718, or storage unit 722. These and other forms of computer-readable media may store one or more instructions for use by processor 704, to cause the processor to perform specified operations. Such instructions, generally referred to as 'computer program code' (which may be grouped in the form of computer programs or other groupings), when executed, enable the computing system 700 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 700 using, for example, removable storage drive 714, drive 712 or communications interface 724. The control logic (in this example, software instructions or computer program code), when executed by the processor 704, causes the processor 704 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. Thus, the elements and components of an embodiment of the invention may be physically, functionally and logically implemented in any suitable way. Indeed, the functionality may be implemented in a single unit, in a plurality of units or as part of other functional units.

Although the invention has been described in connection with embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

We claim:

1. A network element arranged to transmit a data segment over an interface of a wireless communication network, the network element comprising:
   transmission management logic to determine a sequence number of a data segment to be transmitted,
   wherein the transmission management logic is operable to:
      compare the sequence number of the data segment to be transmitted with at least one pending sequence number of a previous data segment, and, based on the comparison,
      discard the data segment to be transmitted in response to the sequence number of the data segment to be transmitted matching the at least one pending sequence number of the previous data segment; and add the sequence number of the data segment to be transmitted to the at least one pending sequence number and transmit the data segment over the interface in response to the sequence number of the data segment to be transmitted not matching the at least one pending sequence number, and wherein a plurality of pending sequence numbers is stored as a list of pending sequence numbers within a memory element of the network element, and the sequence number of the data segment to be transmitted is considered as matching the at least one pending sequence number if a same sequence number is present within the list of pending sequence numbers, wherein the transmission management logic is operable to remove the sequence number of an acknowledged data segment from the list of pending sequence numbers in response to receipt of an acknowledgement that the acknowledged data segment has been successfully received by a user equipment of the wireless communication network.

2. The network element of claim 1 wherein the plurality of pending sequence numbers is stored as a range of sequence numbers, wherein a first pending sequence number, representing a lower limit of the range of sequence numbers, and a second pending sequence number, representing an upper limit of the range of sequence numbers, are stored within the memory element of the network element.

3. The network element of claim 2 wherein the sequence number of the data segment to be transmitted is considered as matching the at least one pending sequence number if the sequence number of the data segment to be transmitted is within the range of sequence numbers represented by the first pending sequence number and second pending sequence number stored in the memory element.

4. The network element of claim 1, wherein the transmission management logic is operable to remove the sequence number of a data segment for which transmission failed from the list of pending sequence numbers in response to receipt of a transmission failure message for the data segment for which transmission has failed.

5. The network element of claim 1, wherein the data segment comprises a Transmission Control Protocol (TCP) data segment.

6. The network element of claim 1, wherein the interface comprises an air interface within the wireless communication network.

7. The network element of claim 6, wherein the transmission management logic is operable to transmit the data segment over the interface by forwarding the data segment to interface control logic.

8. The network element of claim 7, wherein the transmission management logic forms a part of the interface control logic.

9. The network element of claim 7, wherein the interface control logic comprises Radio Link Control (RLC) logic.

10. The network element of claim 7, wherein the interface control logic comprises Hybrid Automatic Repeat reQuest (HARQ) logic.

11. The network element of claim 1, wherein the network element comprises user equipment (UE).

12. The network element of claim 1, wherein the network element comprises a network element within a cellular communication system.

13. The network element of claim 12, wherein the network element comprises a network element within a Radio Access Network (RAN) of the cellular communication system.

14. The network element of claim 12, wherein the network element comprises a Serving General Packet Radio Service (GPRS) Support Node (SGSN).

15. A method for managing transmission of at least one data segment over an interface of a wireless communication network, the method comprising:

receiving a data segment for transmission over the interface;

comparing, in transmission management logic, a sequence number of the received data segment with at least one pending sequence number of at least one previously received data segment;

discarding the received data segment in response to the sequence number of the received data segment matching the at least one pending sequence number;

adding the sequence number of the received data segment to the at least one pending sequence number in response to the sequence number of the received data segment not matching the at least one pending sequence number; and transmitting the received data segment over the interface, wherein a plurality of pending sequence numbers is stored as a list of pending sequence numbers, and the sequence number of the data segment to be transmitted is considered as matching the at least one pending sequence number if a same sequence number is present within the list of pending sequence numbers, an the sequence number of an acknowledged data segment is removed from the list of pending sequence numbers in response to receipt of an acknowledgement that the acknowledged data segment has been successfully received by a user equipment of the wireless communication network.

16. The method of claim 15, wherein the at least one pending sequence number comprises a plurality of pending sequence numbers stored as a list of pending sequence numbers, and comparing a sequence number of the received data segment with at least one pending sequence number of at least one previously received data segment comprises retrieving the list of pending sequence numbers from memory.

17. A non-transitory computer readable medium comprising instructions for managing transmission of at least one data segment over an interface, the instructions for:

receiving a data segment for transmission over the interface;

comparing a sequence number of the received data segment with at least one pending sequence number of at least one previously received data segment;

discarding the received data segment in response to the sequence number of the received data segment matching the at least one pending sequence number;

adding the sequence number of the received data segment to the at least one pending sequence number in response to the sequence number of the received data segment not matching the at least one pending sequence number; and transmitting the received data segment over the interface, wherein a plurality of pending sequence numbers is stored as a list of pending sequence numbers, and the sequence number of the data segment to be transmitted is considered as matching the at least one pending sequence number if a same sequence number is present within the list of pending sequence numbers, an the sequence number of an acknowledged data segment is removed from the list of pending sequence numbers in response to receipt of an acknowledgement that the acknowledged data segment has been successfully received by a user equipment of the wireless communication network.

* * * * *